G. A. KEENE.
FEATHERING PADDLE WHEEL.
APPLICATION FILED JULY 3, 1911.
1,010,434.
Patented Dec. 5, 1911.
2 SHEETS—SHEET 1.
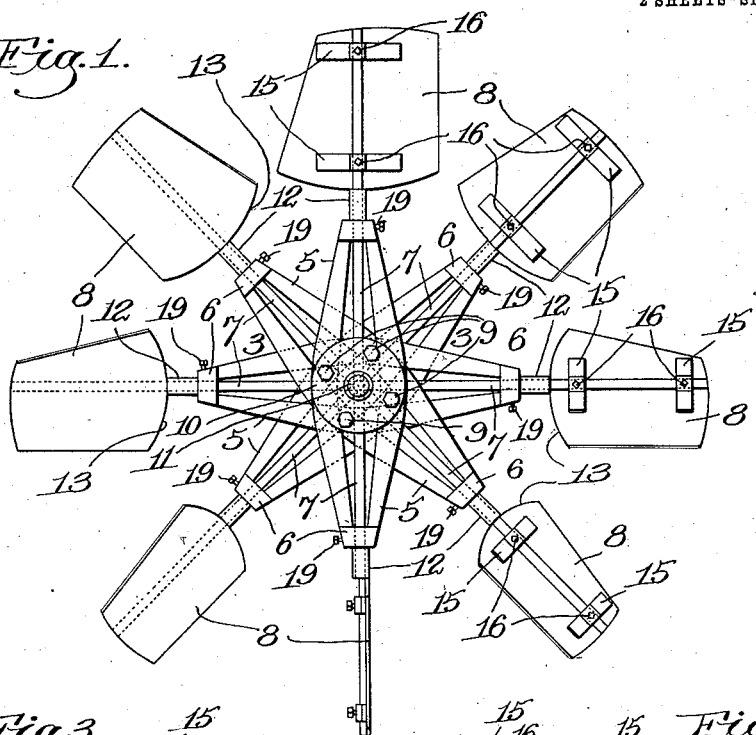
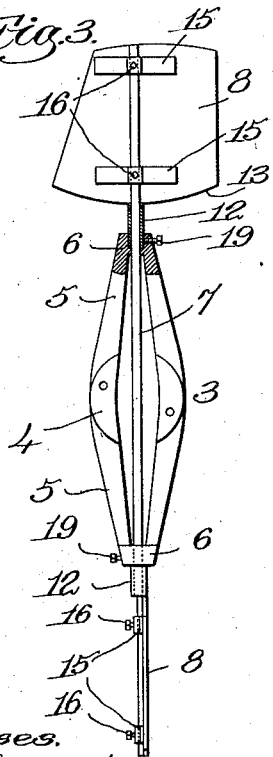
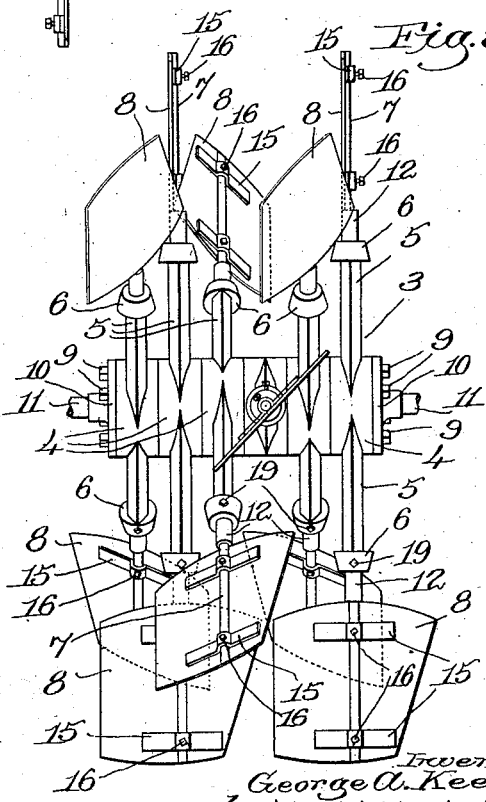

G. A. KEENE.
FEATHERING PADDLE WHEEL.
APPLICATION FILED JULY 3, 1911.
1,010,434.
Patented Dec. 5, 1911.
2 SHEETS—SHEET 2.
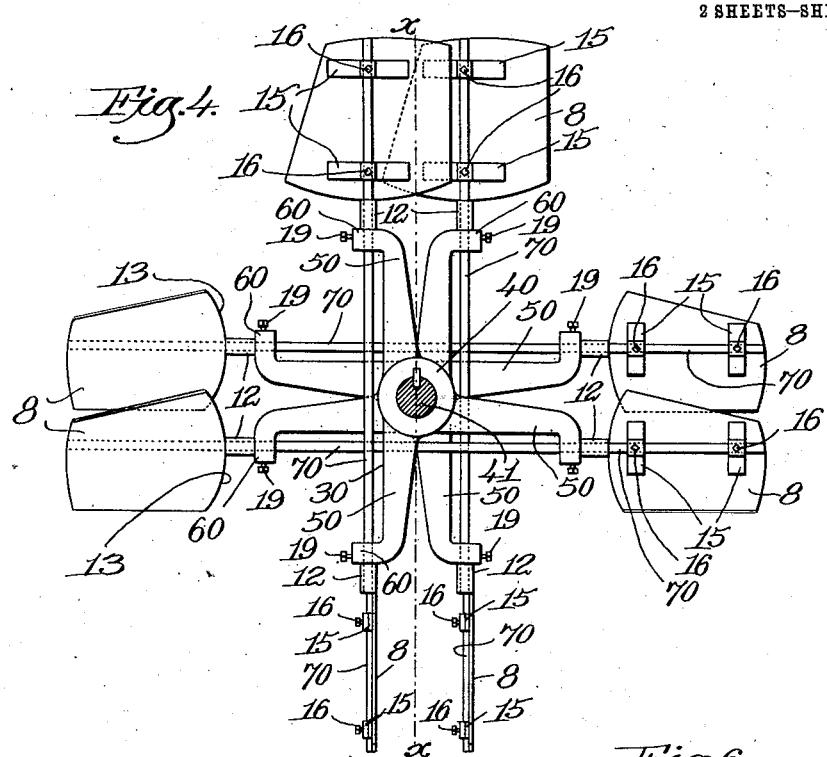
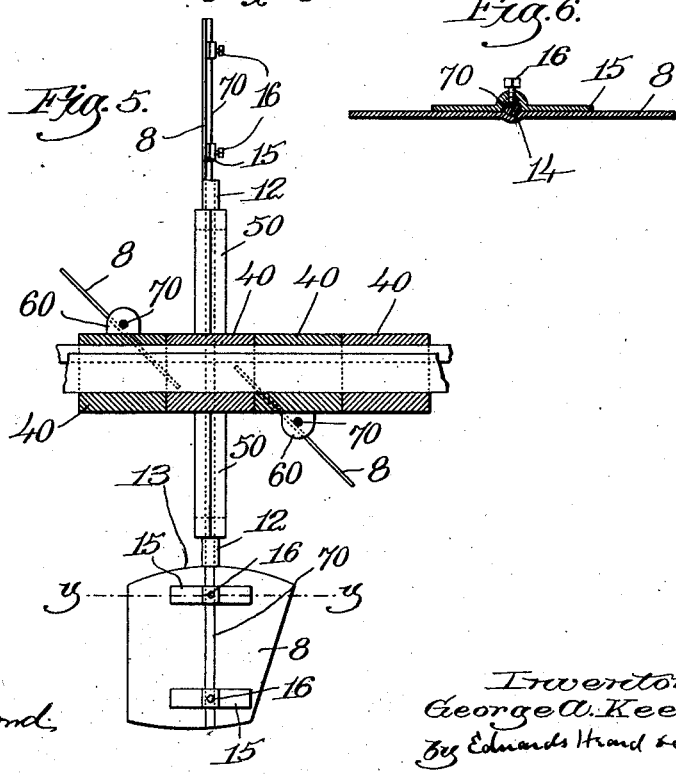
Witnesses:
Thomas J. Drummond
Warren O'Neil
Inventor.
George A. Keene,
By Edwards Hand & Smith
Attys.

UNITED STATES PATENT OFFICE.

GEORGE A. KEENE, OF LYNN, MASSACHUSETTS.

FEATHERING PADDLE-WHEEL.

1,010,434.       Specification of Letters Patent.       Patented Dec. 5, 1911.

Application filed July 3, 1911. Serial No. 636,596.

*To all whom it may concern:*

Be it known that I, GEORGE A. KEENE, a citizen of the United States, and resident of Lynn, county of Essex, State of Massachusetts, have invented an Improvement in Feathering Paddle-Wheels, of which the following description, in connection with the accompanying drawing, is a specification, like characters on the drawing representing like parts.

This invention relates to feathering paddle wheels, and is in the nature of an improvement upon the paddle wheel illustrated in my Patent No. 274,945, dated April 3, 1883.

The paddle wheel shown in said patent comprises a central spider having a plurality of radial arms, and a plurality of shafts sustained by the spider and extending diametrically of the axis of rotation, each shaft having on each end thereof a bucket or blade, the buckets or blades having such a position and construction as to automatically secure the feathering action.

In my present invention I employ a novel construction by means of which a paddle wheel having any desired number of blades can be built up and I secure this result by using a plurality of individual bucket carriers, each of which extends diametrically of the axis of rotation, and each of which carries a rotatable shaft provided at its ends with the buckets or blades. These individual bucket carriers are so constructed that any desired number of them may be employed, depending upon the extent of the bucket surface which it is desired to give the paddle wheel.

In the drawings I have shown some embodiments of my invention which illustrate the principle thereof, but have not attempted to show all ways in which my invention may be constructed.

Figure 1 is a side view of a paddle wheel embodying my invention; Fig. 2 is a rear view of the wheel shown in Fig. 1; Fig. 3 is a view of one of the individual bucket carriers shown in Figs. 1 and 2; Fig. 4 illustrates a modified form of the invention wherein the bucket carriers are mounted on a shaft; Fig. 5 is a section on substantially the line $x$—$x$, Fig. 4; Fig. 6 is an enlarged section on the line $y$—$y$, Fig. 5.

In Figs. 1, 2 and 3, the individual bucket carriers are designated generally by 3, and each comprises a central hub portion 4 from which extend oppositely directed arms 5. Each arm has at its end a bearing 6 for a shaft 7 that extends longitudinally of the carrier, and is rotatably mounted in the bearing. Each shaft 7 carries at its end the buckets or blades 8, said buckets or blades preferably being of the same type as that shown in my prior Patent No. 274,945. These individual bucket carriers are adapted to be connected together with their hubs in alinement, and they may be secured in such position in any suitable way. I have herein shown the hubs of the bucket carriers as held together by bolts 9 that extend transversely through the hubs. The bucket carriers will be preferably clamped between two heads 10, each of which is supported on the end of a shaft section 11, said shaft sections constituting the shaft on which the paddle wheel is supported, and about which it rotates. In assembling the parts the individual bucket carriers are arranged with their arms radiating at different angles as shown in Figs. 1 and 2. The angular distance between the arms of adjacent bucket carriers depends somewhat upon the size of the blades or buckets. It will, of course, be obvious that the arms of adjacent bucket carriers must be spaced apart sufficiently so that the buckets will not interfere with each other.

In the embodiment of the invention shown in Figs. 1 and 2, I have arranged the individual bucket carriers so that when the paddle wheel is looked at from the side as shown in Fig. 1, it appears to have eight arms. The paddle wheel of any desired width can be built up by using any number of the individual bucket carriers as will be obvious, and in Fig. 2, I have shown a paddle wheel having six such individual sections or carriers, the fifth carrier being arranged in parallelism with the first and the sixth with the second, and so on. In this embodiment the supporting shaft 11 does not extend through the axis of the paddle wheel, and the diametrically arranged shafts 7 extend through the axis of rotation.

In Figs. 4 and 5 I have illustrated a different embodiment of my invention wherein the individual sections or blade carriers are sustained on a shaft which extends through the hubs. In this construction the carriers which are designated 30 each is provided with a hub 40 having an aperture through which the shaft 41 may extend, and the arms 50 of the carrier are shaped so that the bearings 60 for the shaft 70 are situated at one side of a diametrical line so that the shaft 70 will pass outside of the supporting shaft 41 and will not interfere therewith. The individual sections 30 may be secured to the shaft 41 in any suitable way, and I have herein shown them as being keyed to the shaft. A set screw or any other holding device may be employed instead of the key, however.

Each bearing 6 has associated therewith a sleeve or extension 12 through which the shaft 7 extends, and which meets the back side 13 of the blade 8, said sleeves holding the shaft 7 against longitudinal movement. I will preferably make the blades or buckets 8 removable from the shaft 7, and this may conveniently be done by making each bucket with a groove 14 to receive the shaft 7 and providing each bucket with one or more cleats 15 which embrace the shaft and are rigidly secured to the buckets. Each cleat is shown as carrying a set screw or clamping screw 16 which can be set up against the shaft 7, thus firmly holding the bucket to the shaft, and by loosening the set screws, the buckets can be readily slipped off the end of the shaft as will be obvious, thus permitting the shaft to be readily removed in case repairs are necessary. This construction also facilitates the assembling of the parts.

In case it is desired to alter the paddle wheel by changing the diameter thereof, it is simply necessary to remove the buckets from the shafts 7 and replace said shafts with longer shafts, and then apply the buckets to the longer shafts. When this change is made the sleeves 12 will be also replaced by sleeves of sufficient length to engage the rear edge of the buckets. To permit this to be done the sleeves 12 are detachably sustained in the bearing 6, as shown in Fig. 3, each sleeve being held in place by a set screw 19. These sleeves 12 serve not only to prevent longitudinal movement of the shaft 7, but also form an extended bearing therefor, and lend strength thereto at a point beyond the carriers.

With my construction it will be readily seen that a paddle wheel having any desired number of buckets can be readily provided by merely assembling together the requisite number of individual bucket carriers.

While I have illustrated two embodiments of my invention, I do not wish to be limited to the construction shown, nor in any way, except by the appended claims.

Having fully described my invention, what I claim as new and desire to secure by Letters Patent is:

1. In a paddle wheel the combination with a plurality of individual bucket carriers, each comprising a central hub and oppositely disposed arms extending radially from the axis of rotation, a shaft extending longitudinally of each bucket carrier and rotatably mounted therein, buckets carried by the shaft, and means to secure the individual carriers together with their hubs in alinement and with the arms of adjacent carriers radiating in different directions.

2. In a paddle wheel, the combination with a plurality of individual bucket carriers, each extending diametrically across the axis of rotation and each provided with a central hub, of means to secure said individual carriers together with their hubs in alinement, each carrier having a bearing at each end thereof, a shaft extending longitudinally of each carrier and rotatably mounted in the bearings thereon, and buckets carried by the ends of the shafts.

3. In a paddle wheel, the combination with a plurality of individual bucket carriers, each extending diametrically across the axis of rotation, and each provided with a central hub, of means to secure said individual carriers together with their hubs in alinement, each carrier having a bearing at each end thereof, a shaft extending longitudinally of each carrier, and rotatably mounted in the bearings thereon, and buckets carried by the end of the shafts, and sleeves sustained by the bearings and extending beyond the carriers and through which the shafts extend, said sleeves strengthening the shafts and preventing longitudinal movement thereof.

4. In a paddle wheel the combination with a plurality of individual bucket carriers each extending diametrically across the axis of rotation and each provided with a central hub and bearings at its ends, of means to secure said individual carriers together with their hubs in alinement, a shaft extending longitudinally of each carrier and rotatably mounted in the bearings thereon, and buckets removably carried by the ends of the shaft.

In testimony whereof, I have signed my name to this specification, in the presence of two subscribing witnesses.

GEORGE A. KEENE.

Witnesses:
 LOUIS C. SMITH,
 THOMAS J. DRUMMOND.